(12) United States Patent
Kerr et al.

(10) Patent No.: US 6,590,894 B1
(45) Date of Patent: *Jul. 8, 2003

(54) NETWORK FLOW SWITCHING AND FLOW DATA EXPORT

(75) Inventors: Darren R. Kerr, Union City, CA (US); Barry L. Bruins, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,941

(22) Filed: Jan. 14, 2000

Related U.S. Application Data

(63) Continuation of application No. 08/655,429, filed on May 28, 1996.

(51) Int. Cl.[7] ............................................... H04L 12/56
(52) U.S. Cl. ................................... 370/392; 370/395.32
(58) Field of Search ............................. 370/229, 389, 370/392, 395, 401, 395.1, 395.3, 395.31, 395.32, 473; 709/238

(56) References Cited

U.S. PATENT DOCUMENTS

| | | | | | |
|---|---|---|---|---|---|
| 4,933,938 | A | * | 6/1990 | Sheehy ........................ 370/401 |
| 5,280,480 | A | * | 1/1994 | Pitt et al. ..................... 370/256 |
| 5,287,535 | A | * | 2/1994 | Sakagawa et al. ............ 370/60 |
| 5,291,442 | A | * | 3/1994 | Emma et al. ................. 711/120 |
| 5,325,504 | A | * | 6/1994 | Tipley et al. ................ 711/128 |
| 5,347,642 | A | * | 9/1994 | Barratt ........................ 711/113 |
| 5,394,408 | A | * | 2/1995 | Nishihara et al. ............ 714/812 |
| 5,418,922 | A | * | 5/1995 | Liu ............................... 711/3 |
| 5,442,624 | A | * | 8/1995 | Bonomi et al. .............. 370/231 |
| 5,444,491 | A | * | 8/1995 | Lim ............................. 348/441 |
| 5,450,406 | A | * | 9/1995 | Esaki et al. .................... 370/60 |
| 5,515,376 | A |   | 5/1996 | Murthy et al. |
| 5,523,999 | A | * | 6/1996 | Takano et al. ............... 370/389 |
| 5,528,592 | A | * | 6/1996 | Schibler et al. ............. 370/397 |
| 5,533,033 | A | * | 7/1996 | Ratner ......................... 714/746 |
| 5,557,747 | A | * | 9/1996 | Rogers et al. ............... 709/223 |
| 5,566,170 | A | * | 10/1996 | Bakke et al. ................. 370/392 |
| 5,583,865 | A | * | 12/1996 | Esaki et al. .................. 370/397 |
| 5,608,908 | A | * | 3/1997 | Barghouti et al. ............ 395/703 |
| 5,610,904 | A | * | 3/1997 | Eng et al. .................... 370/408 |
| 5,614,891 | A | * | 3/1997 | Zeinstra et al. ........ 340/825.22 |
| 5,625,622 | A | * | 4/1997 | Johri ........................... 370/232 |
| 5,644,751 | A | * | 7/1997 | Burnett ........................ 711/113 |
| 5,699,532 | A | * | 12/1997 | Barrett et al. ............... 710/129 |
| 5,754,768 | A | * | 5/1998 | Brech et al. ............. 395/200.6 |
| 5,842,040 | A | * | 11/1998 | Hughes et al. ................ 710/11 |
| 6,091,725 | A | * | 7/2000 | Cheriton et al. ............. 370/392 |
| 6,343,322 | B2 | * | 1/2002 | Nagami et al. .............. 709/227 |

* cited by examiner

*Primary Examiner*—Min Jung
(74) *Attorney, Agent, or Firm*—Baker Botts L.L.P.

(57) ABSTRACT

The invention provides a method and system for switching in networks responsive to message flow patterns. A message "flow" is defined to comprise a set of packets to be transmitted between a particular source and a particular destination. When routers in a network identify a new message flow, they determine the proper processing for packets in that message flow and cache that information for that message flow. Thereafter, when routers in a network identify a packet which is part of that message flow, they process that packet according to the proper processing for packets in that message flow. The proper processing may include a determination of a destination port for routing those packets and a determination of whether access control permits routing those packets to their indicated destination.

33 Claims, 5 Drawing Sheets

NETWORK FLOW SWITCHING AND FLOW DATA EXPORT

This is a continuation of application Ser. No. 08/655,429, filed May 28, 1996.

BACKGROUND OF THE INVENTION

1. Field of the Invention

This invention relates to network switching and data export responsive to message flow patterns.

2. Description of Related Art

In computer networks, it commonly occurs that message traffic between a particular source and a particular destination will continue for a time with unchanged routing or switching parameters. For example, when using the file-transfer protocol "FTP" there is substantial message traffic between the file's source location and the file's destination location, comprising the transfer of many packets which have similar headers, differing in the actual data which is transmitted. During the time when message traffic continues, routing and switching devices receiving packets comprising that message traffic must examine those packets and determine the processing thereof.

One problem which has arisen in the art is that processing demands on routing and switching devices continue to grow with increased network demand. It continues to be advantageous to provide techniques for processing packets more quickly. This problem has been exacerbated by addition of more complex forms of processing, such as the use of access control lists.

It would therefore be advantageous to provide techniques in which the amount of processing required for any individual packet could be reduced. With inventive techniques described herein, information about message flow patterns is used to identify packets for which processing has already been determined, and therefore to process those packets without having to re-determine the same processing. The amount of processing required for any individual packet is therefore reduced.

Information about message flow patterns would also be valuable for providing information about use of the network, and could be used for a variety of purposes by network administrators, routing devices, service providers, and users.

Accordingly, it would be advantageous to provide a technique for network switching and data export responsive to message flow patterns.

SUMMARY OF THE INVENTION

The invention provides a method and system for switching in networks responsive to message flow patterns. A message "flow" is defined to comprise a set of packets to be transmitted between a particular source and a particular destination. When routers in a network identify a new message flow, they determine the proper processing for packets in that messageflow and cache that information for that message flow. Thereafter, when routers in a network identify a packet which is part of that message flow, they process that packet according to the proper processing for packets in that message flow. The proper processing may induce a determination of a destination port for routing those packets and a determination of whether access control permits routing those packets to their indicated destination.

In another aspect of the invention, information about message flow patterns is collected, responsive to identified message flows and their packets. The collected information is reported to devices on the network. The collected information is used for a variety of purposes, including: to diagnose actual or potential network problems, to determine patterns of usage by date and time or by location, to determine which services and which users use a relatively larger or smaller amount of network resources, to determine which services are accessed by particular users, to determine which users access particular services, or to determine usage which falls within selected parameters (such as: access during particular dates or times, access to prohibited services, excessive access to particular services, excessive use of network resources, or lack of proper access).

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

Message Flows

Figure 1:
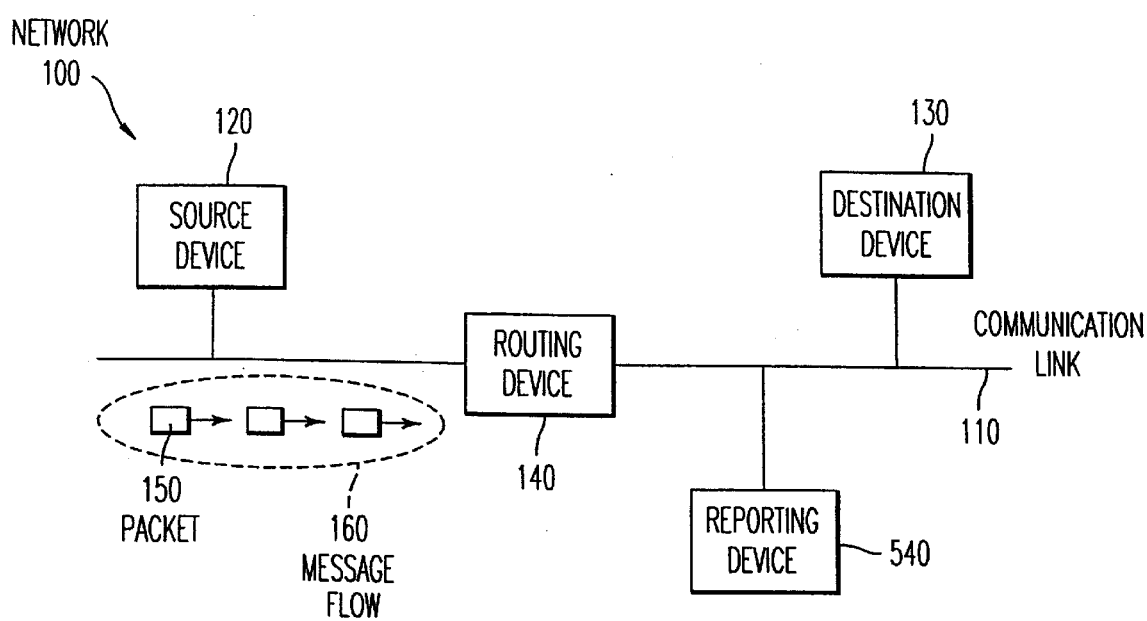
FIG. 1 shows a network in which routing responsive to message flow patterns is performed.

FIG. 1 shows a network in which routing responsive to message flow patterns is performed.

A network 100 includes at least one communication link 110, at least one source device 120, at least one destination device 130, and at least one routing device 140. The routing device 140 is disposed for receiving a set of packets 150 from the source device 120 and routing them to the destination device 130.

The communication link 110 may comprise any form of physical media layer, such as ethernet, FDDI, or HDLC serial link.

The routing device 140 comprises a routing processor for performing the process steps described herein, and may include specific hardware constructed or programmed performing the process steps described herein, a general purpose processor operating under program control, or some combination thereof.

A message flow 160 consists of a unidirectional stream. of packets 150 to be transmitted between particular pairs of transport service access points (thus, network-layer addresses and port numbers). In a broad sense, a message flow 160 thus refers to a communication "circuit" between communication end-points. In a preferred embodiment, a message flow 160 is defined by a network-layer address for a particular source device 120, a particular port number at the source device 120, a network-layer address for a particular destination device 130, a particular port number at the destination device 130, and a particular transmission protocol type. For example, the transmission protocol type may identify a known transmission protocol, such as UDP, TCP, ICMP, or IGMP (internet group management protocol).

In a preferred embodiment for use with a network of networks (an "internet"), the particular source device 120 is identified by its IP (internet protocol) address. The particular port number at the source device 120 is identified by either a port number which is specific to a particular process, or by a standard port number for the particular transmission protocol type. For example, a standard port number for the TCP protocol type is 6 and a standard port number for the UDP protocol type is 17. Other protocols which may have standard port numbers include the FTP protocol, the TELNET protocol, an internet telephone protocol, or an internet video protocol such as the "CUSeeMe" protocol; these protocols are known in the art of networking. Similarly, the particular destination device 130 is identified by its IP (internet protocol) address; the particular port number at the destination device 130 is identified by either a port number which is specific to a particular process, or a standard port number for the particular transmission protocol type.

It will be clear to those skilled in the art, after perusing this application, that the concept of a message flow is quite broad, and encompasses a wide variety of possible alternatives within the scope and spirit of the invention. For example, in alternative embodiments, a message flow may be bi-directional instead of unidirectional, a message flow may be identified at a different protocol layer level than that of transport service access points, or a message flow may be identified responsive to other factors. These other factors may include one or more of the following: information in packet headers, packet length, time of packet transmission, or routing conditions on the network (such as relative network congestion or administrative policies with regard to routing and transmission).

Network Flow Switching

Figure 2:
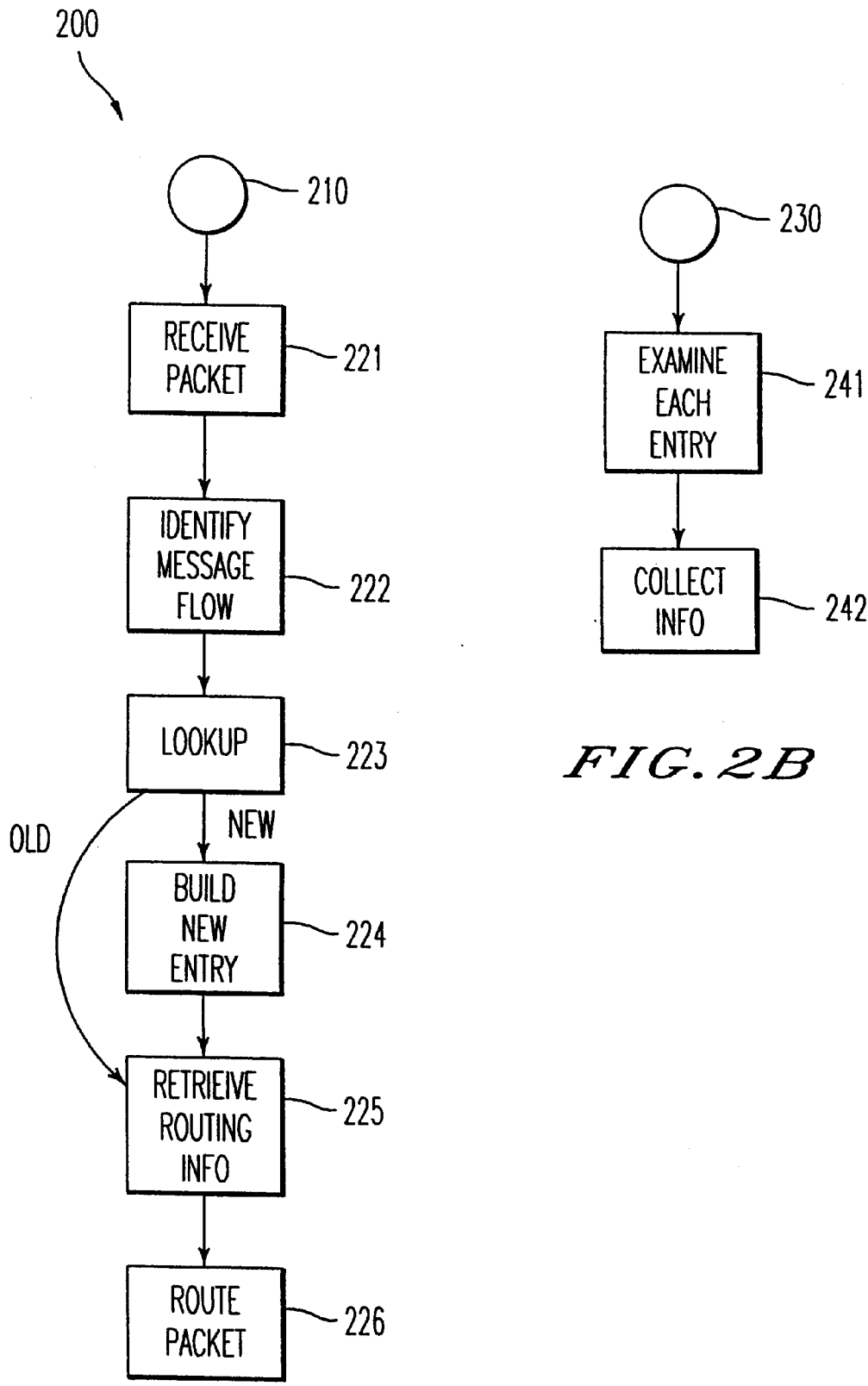
FIG. 2 shows a method for routing in networks responsive to message flow patterns.

FIG. 2 shows a method for routing in networks responsive to message flow patterns.

In broad overview, the method for routing in networks responsive to message flow patterns comprises two parts. In a first part, the routing device 140 builds and uses a flow cache (described in further detail with regard to FIG. 3), in which routing information to be used for packets 150 in each particular message flow 160 is recorded and from which such routing information is retrieved for use. In a second part, the routing device 140 maintains the flow cache, such as by removing entries for message flows 160 which are no longer considered valid.

A method 200 for routing in networks responsive to message flow patterns is performed by the routing device 140.

At a flow point 210, the routing device 140 is disposed for building and using the flow cache.

At a step 221, the routing device 140 receives a packet 150.

At a step 222, the routing device 140 identifies a message flow 160 for the packet 150. In a preferred embodiment, the routing device 140 examines a header for the packet 150 and identifies the IP address for the source device 120, the IP address for the destination device 130, and the protocol type for the packet 150. The routing device 140 determines the port number for the source device 120 and the port number for the destination device 130 responsive to the protocol type. Responsive to this set of information, the routing device 140 determines a flow key 310 (described with reference to FIG. 3) for the message flow 160.

At a step 223, the routing device 140 performs a lookup in a flow cache for the identified message flow 160. If the lookup is unsuccessful, the identified message flow 160 is a "new" message flow 160, and the routing device 140 continues with the step 224. If the lookup is successful, the identified message flow 160 is an "old" message flow 160, and the routing device 140 continues with the step 225.

In a preferred embodiment, the routing device 140 determines a hash table key responsive to the flow key 310. This aspect of the step 223 is described in further detail with regard to FIG. 3.

Figure 4:
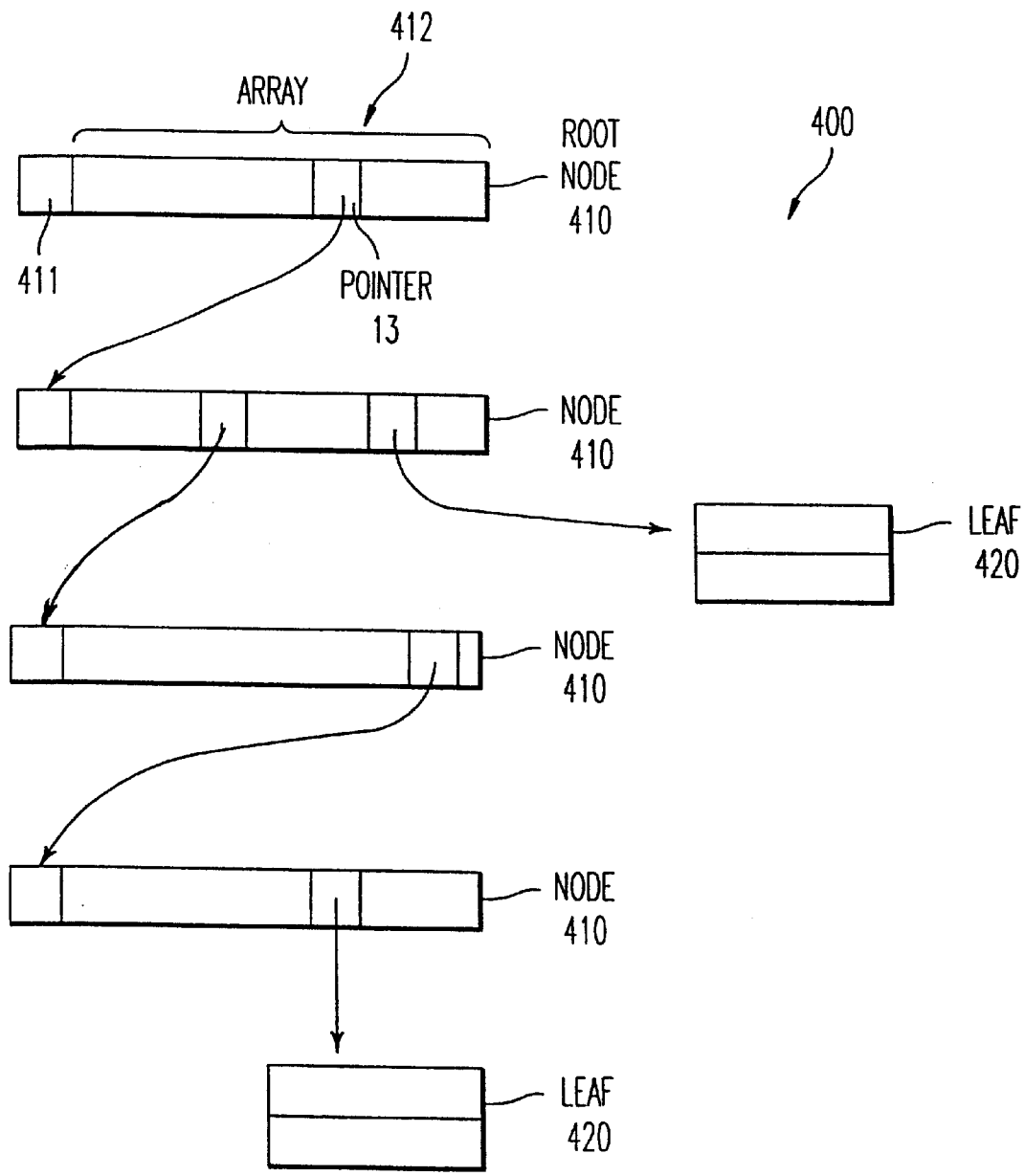
FIG. 4 shows an IP address cache for use with a method for routing in networks responsive to message flow patterns.

At a step 224, the routing device 140 builds a new entry in the flow cache. The routing device 140 determines proper treatment of packets 150 in the message flow 160 and enters information regarding such proper treatment in a data structure pointed to by the new entry in the flow cache. In a preferred embodiment, the routing device 140 determines the proper treatment by performing a lookup in an IP address cache as shown in FIG. 4.

In a preferred embodiment, the proper treatment of packets 150 in the message flow 160 includes treatment with regard to switching (thus, the routing device 140 determines an output port for switching packets 150 in the message flow 160), with regard to access control (thus, the routing device 140 determines whether packets 150 in the message flow 160 meet the requirements of access control, as defined by access control lists in force at the routing device 140), with regard to accounting (thus, the routing device 140 creates an accounting record for the message flow 160), with regard to encryption (thus, the routing device 140 determines encryption treatment for packets 150 in the message flow 160), and any special treatment for packets 150 in the message flow 160.

In a preferred embodiment, the routing device 140 performs any special processing for new message flows 160 at this time. For example, in one preferred embodiment, the routing device 140 requires that the source device 120 or the destination device 130 must authenticate the message flow 160. In that case, the routing device 140 transmits one or more packets 150 to the source device 120 or the destination device 130 to request information (such as a user identifier and a password) to authenticate the new message flow 160, and receives one or more packets 150 comprising the authentication information. This technique could be useful for implementing security "firewalls" and other authentication systems.

Thereafter, the routing device 140 proceeds with the step 225, using the information from the new entry in the flow cache, just as if the identified message flow 160 were an "old" message flow 160 and the lookup in a flow cache had been successful.

At a step 225, the routing device 140 retrieves routing information from the entry in the flow cache for the identified message flow 160.

In a preferred embodiment, the entry in the flow cache includes a pointer to a rewrite function for at least part of a header for the packet 150. If this pointer is non-null, the routing device 140 invokes the rewrite function to alter the header for the packet 150.

At a step 226, the routing device 140 routes the packet 150 responsive to the routing information retrieved at the step 225.

Thus, in a preferred embodiment, the routing device 140 does not separately determine, for each packet 150 in the message flow 160, the information stored in the entry in the flow cache. Rather, when routing a packet 150 in the message flow 160, the routing device 140 reads the information from the entry in the flow cache and treats the packet 150 according to the information in the entry in the flow cache.

Thus, in a preferred embodiment, the routing device 140 routes the packet 150 to an output port, determines whether access is allowed for the packet 150, determines encryption treatment for the packet 150, and performs any special treatment for the packet 150, all responsive to information in the entry in the flow cache.

In a preferred embodiment, the routing device 140 also enters accounting information in the entry in the flow cache for the packet 150. When routing each packet 150 in the message flow 160, the routing device 140 records the cumulative number of packets 150 and the cumulative number of bytes for the message flow 160.

Because the routing device 140 processes each packet 150 in the message flow 160 responsive to the entry for the message flow 160 in the flow cache, the routing device 140 is able to implement administrative policies which are designated for each message flow 160 rather than for each packet 150. For example, the routing device 140 is able to reserve specific amounts of bandwidth for particular message flows 160 and to queue packets 150 for transmission responsive to the bandwidth reserved for their particular message flows 160.

Because the routing device 140 is able to associate each packet 150 with a particular message flow 160 and to associate each message flow 160 with particular network-layer source and destination addresses, the routing device 140 is able to associate network usage with particular work stations (and therefore with particular users) or with particular services available on the network. This can be used for accounting purposes, for enforcing administrative policies, or for providing usage information to interested parties.

For a first example, the routing device 140 is able to monitor and provide usage information regarding access using the HTTP protocol to world wide web pages at particular sites.

For a second example, the routing device 140 is able to monitor usage information regarding relative use of network resources, and to give priority to those message flows 160 which use relatively fewer network resources. This can occur when a first message flow 160 is using a relatively low-bandwidth transmission channel (such as a 28.8 kilobits per second modem transmission channel) and when a second message flow 160 is using a relatively high-bandwidth transmission channel (such as a T-1 transmission line).

At a flow point 230, the routing device 140 is disposed for maintaining the flow cache.

At a step 241, the routing device 140 examines each entry in the flow cache and compares a current time with a last time a packet 150 was routed using that particular entry. If the difference exceeds a first selected timeout, the message flow 160 represented by that entry is considered to have expired due to nonuse and thus to no longer be valid.

In a preferred embodiment, the routing device 140 also examines the entry in the flow cache and compares a current time with a first time a packet 150 was routed using that particular entry. If the difference exceeds a second selected timeout, the message flow 160 represented by that entry is considered to have expired due to age and thus to no longer be valid. The second selected timeout is preferably about one minute.

Expiring message flows 160 due to age artificially requires that a new message flow 160 must be created for the next packet 150 in the same communication session represented by the old message flow 160 which was expired. However, it is considered preferable to do so because it allows information to be collected and reported about message flows 160 without having to wait for those message flows 160 to expire from nonuse. For example, a multiple-broadcast communication session could reasonably last well beyond the time message flows 160 are expired for age, and if not so expired would mean that information about network usage would not account for significant network usage.

In a preferred embodiment, the routing device 140 also examines the entry in the flow cache and determines if the "next hop" information has changed. If so, the message flow 160 is expired due to changed conditions. Other changed conditions which might cause a message flow 160 to be expired include changes in access control lists or other changes which might affect the proper treatment of packets 150 in the message flow 160. The routing device 140 also expires entries in the flow cache on a least-recently-used basis if the flow cache becomes too full.

If the message flow 160 is still valid, the routing device 140 continues with the next entry in the flow cache until all entries have been examined. If the message flow 160 is no longer valid, the routing device 140 continues with the step 242.

At a step 242, the routing device 140 collects historical information about the message flow 160 from the entry in the flow cache, and deletes the entry.

Flow Cache

Figure 3:
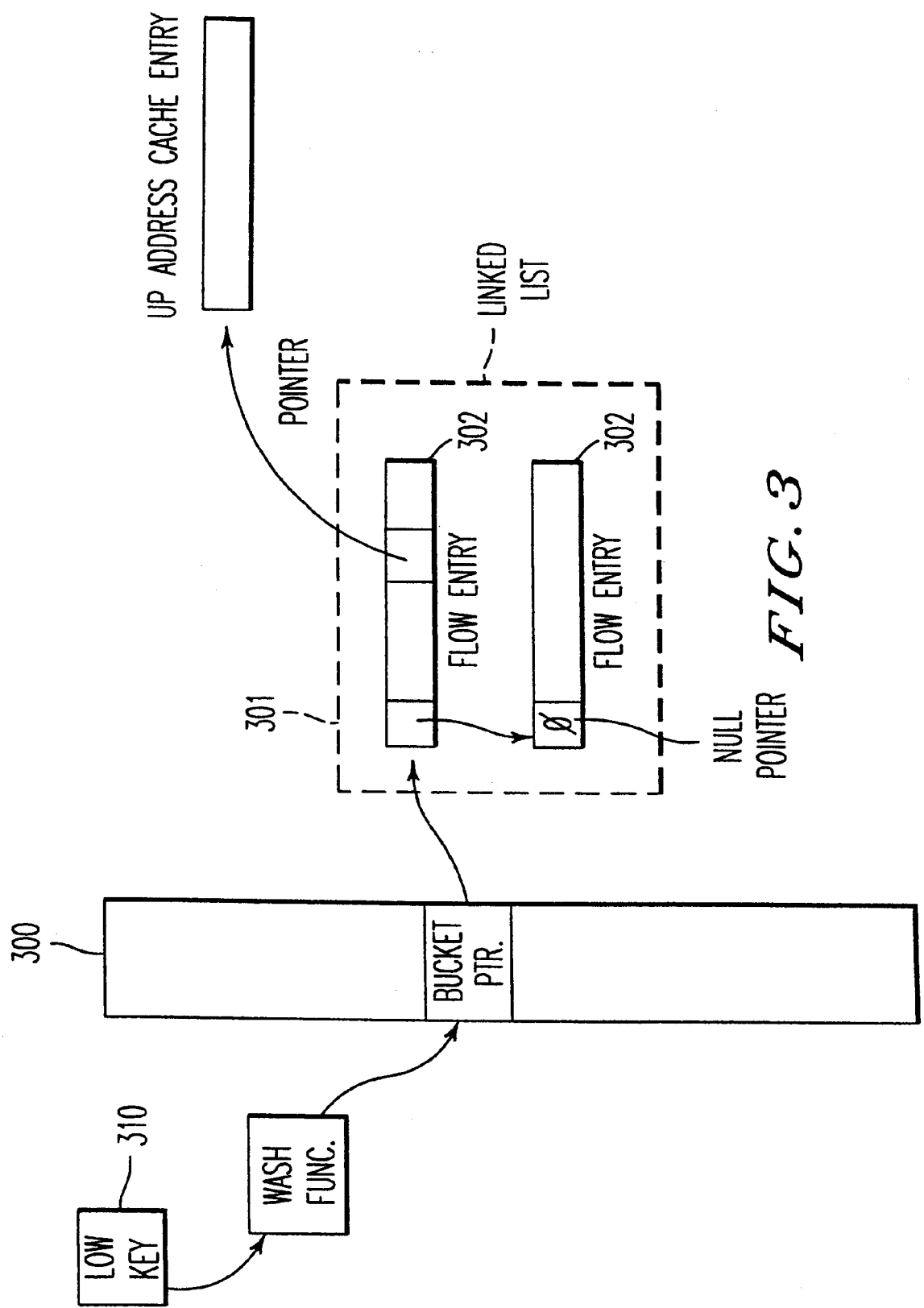
FIG. 3 shows data structures for use with a method for routing in networks responsive to message flow patterns.

FIG. 3 shows data structures for use with a method for routing in networks responsive to message flow patterns.

A flow cache 300 comprises a memory which associates flow keys 310 with information about message flows 160 identified by those flow keys 310. The flow cache 300 includes a set of buckets 301. Each bucket 301 includes a linked list of entries 302. Each entry 302 includes information about a particular message flow 160, including routing, access control, accounting, special treatment for packets 150 in that particular message flow 160, and a pointer to information about treatment of packets 150 to the destination device 130 for that message flow 160.

In a preferred embodiment, the flow cache 300 includes a relatively large number of buckets 301 (preferably about 16,384 buckets 301), so as to minimize the number of entries 302 per bucket 301 and thus so as to minimize the number of memory accesses per entry 302. Each bucket 301 comprises a four-byte pointer to a linked list of entries 302. The linked list preferably includes only about one or two entries 302 at the most.

In a preferred embodiment, each entry 302 includes a set of routing information, a set of access control information, a set of special treatment information, and a set of accounting information, for packets 150 in the message flow 160.

The routing information comprises the output port for routing packets 150 in the message flow 160.

The access control information comprises whether access is permitted for packets 150 in the message flow 160.

The accounting information comprises a time stamp for the first packet 150 in the message flow 160, a time stamp for the most recent packet 150 in the message flow 160, a cumulative count for the number of packets 150 in the message flow 160, and a cumulative count for the number of bytes 150 in the message flow 160.

IP Address Cache

FIG. 4 shows an IP address cache for use with a method for routing in networks responsive to message flow patterns.

An IP address cache 400 comprises a tree having a root node 410, a plurality of inferior nodes 410, and a plurality of leaf data structures 420.

Each node 410 comprises a node/leaf indicator 411 and an array 412 of pointers 413.

The node/leaf indicator 411 indicates whether the node 410 is a node 410 or a leaf data structure 420; for nodes 410 it is set to a "node" value, while for leaf data structures 420 it is set to a "leaf" value.

The array 412 has room for exactly 256 pointers 413; thus, the IP address cache 400 comprises an M-trie with a branching width of 256 at each level. M-tries are known in the art of tree structures. IP addresses comprise four bytes, each having eight bits and therefore 256 possible values. Thus, each possible IP address can be stored in the IP address cache 400 using at most four pointers 413.

The inventors have discovered that IP addresses in actual use are unexpectedly clustered, so that the size of the IP address cache 400 is substantially less, by a factor of about five to a factor of about ten, than would be expected for a set of randomly generated four-byte IP addresses.

Each pointer 413 represents a subtree of the IP address cache 400 for its particular location in the array 412. Thus, for the root node 410, the pointer 413 at location 3 represents IP addresses having the form 3.xxx.xxx.xxx, where "xxx" represents any possible value from zero to 255. Similarly, in a sub-tree for IP addresses having the form 3.xxx.xxx.xxx, the pointer 413 at location 141 represents IP addresses having the form 3.141.xxx.xxx. Similarly, in a subtree for IP addresses having the form 3.141.xxx.xxx, the pointer 413 at location 59 represents IP addresses having the form 3.141.59.xxx. Similarly, in a sub-tree for IP addresses having the form 3.141.59.xxx, the pointer 413 at location 26 represents the IP address 3.141.59.26.

Each pointer 413 is either null, to indicate that there are no IP addresses for the indicated subtree, or points to an inferior node 410 or leaf data structure 420. A least significant bit of each pointer 413 is reserved to indicate the type of the pointed-to structure; that is, whether the pointed-to structure is a node 410 or a leaf data structure 420. In a preferred embodiment where pointers 413 must identify an address which is aligned on a four-byte boundary, the two least significant bits of each pointer 413 are unused for addressing, and reserving the least significant bit for this purpose does not reduce the scope of the pointer 413.

Each leaf data structure comprises information about the IP address, stored in the IP address cache 400. In a preferred embodiment this information includes the proper processing for packets 150 addressed to that IP address, such as a determination of a destination port for routing those packets and a determination of whether access control permits routing those packets to their indicated destination.

Flow Data Export

Figures 5A, 5B:
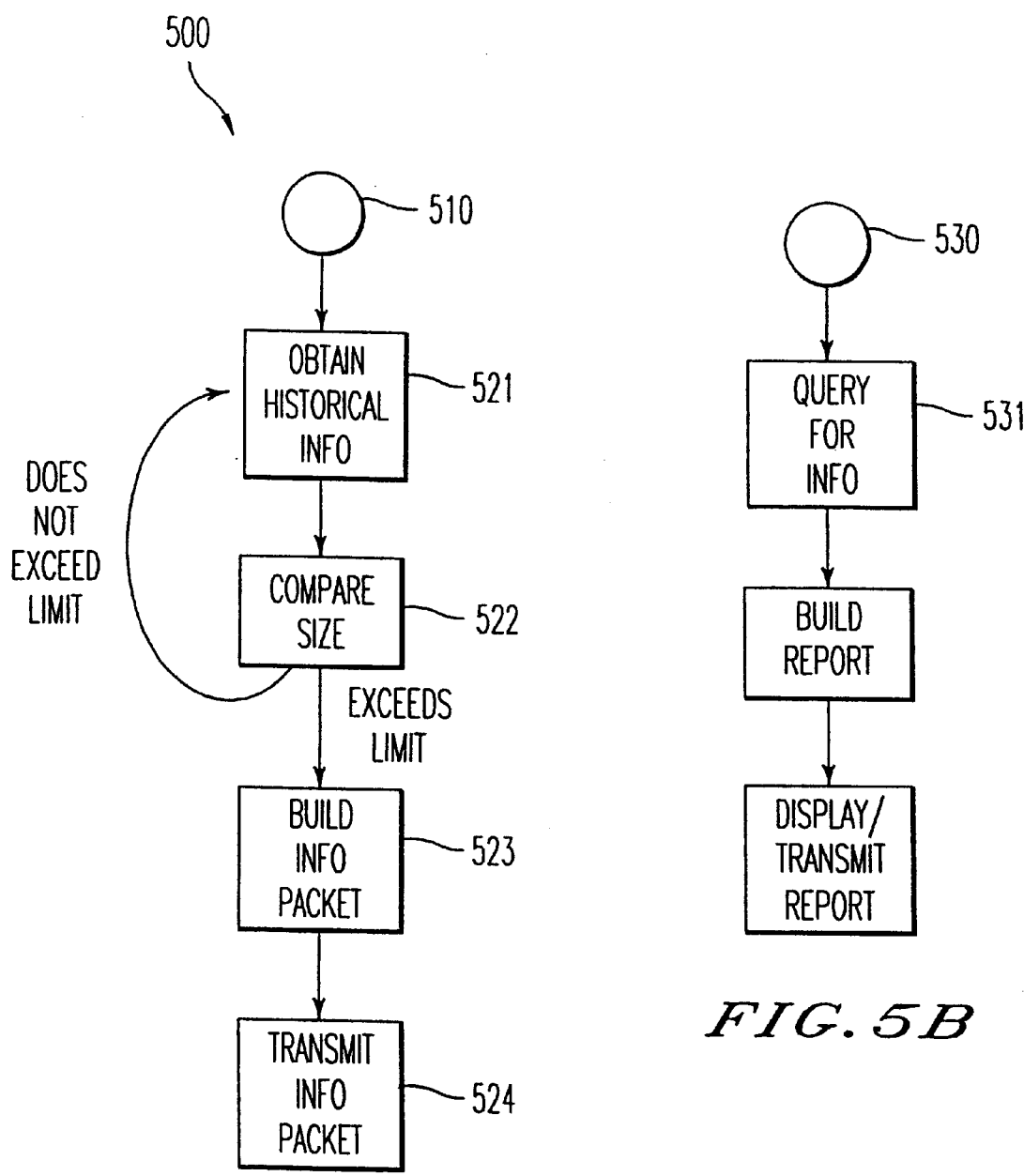
FIG. 5 shows a method for collecting and reporting information about message flow patterns.

FIG. 5 shows a method for collecting and reporting information about message flow patterns.

A method 500 for collecting and reporting information about message flow patterns is performed by the routing device 140.

At a flow point 510, the routing device 140 is disposed for obtaining information about a message flow 160. For example, in a preferred embodiment, as noted herein, the routing device 140 obtains historical information about a message flow 160 in the step 242. In alternative embodiments, the routing device 140 may obtain information about message flows 160, either in addition or instead, by occasional review of entries in the flow cache, or by directly monitoring packets 150 in message flows 160.

It will be clear to those skilled in the art, after perusing this application, that the concept of reporting information about message flows is quite broad, and encompasses a wide variety of possible alternatives within the scope and spirit of the invention. For example, in alternative embodiments, information about message flows may include bi-directional traffic information instead of unidirectional traffic information, information about message flows may include information at a different protocol layer level other than that of transport service access points and other than that at which the message flow is itself defined, or information about message flows may include actual data transmitted as part of the message flow itself. These actual data may include one or more of the following: information in packet headers, information about files of file names transmitted during the message flow, or usage conditions of the message flow (such as whether the message flow involves steady or bursty transmission of data, or is relatively interactive or relatively unidirectional).

At a step 521, the routing device 140 obtains historical information about a particular message flow 160, and records that information in a flow data table.

At a step 522, the routing device 140 determines a size of the flow data table, and compares that size with a selected size value. If the flow data table exceeds the selected size value, the routing device 140 continues with the step 523 to report flow data. If the flow data table does not exceed the selected size value, the routing device 140 returns to the step 521 to obtain historical information about a next particular message flow 160.

At a step 523, the routing device 140 builds an information packet, responsive to the information about message flows 160 which is recorded in the flow data table.

At a step 524, the routing device 140 transmits the information packet to a selected destination device 130 on the network 100. In a preferred embodiment, the selected destination device 130 is determined by an operating parameter of the routing device 140. This operating parameter is set when the routing device 140 is initially configured, and may be altered by an operator of the routing device 140.

In a preferred embodiment, the selected destination device 130 receives the information packet and builds (or updates) a database in the format for the RMON protocol. The RMON protocol is known in the art of network monitoring.

At a flow point 530, a reporting device 540 on the network 100 is disposed for reporting using information about message flows 160.

At a step 531, the reporting device 540 queries the selected destination device 130 for information about message flows 160. In a preferred embodiment, the reporting device 540 uses the RMON protocol to query the selected destination device 130 and to obtain information about message flows 160.

At a step 532, the reporting device 540 builds a report about a condition of the network 100, responsive to information about message flows 160.

At a step 533, the reporting device 540 displays or transmits that report about the condition of the network 100 to interested parties.

In preferred embodiments, the report may comprise one or more of a wide variety of information, and interested parties may use that information for one or more of a wide variety of purposes. Some possible purposes are noted herein:

Interested parties may diagnose actual or potential network problems. For example, the report may comprise information about packets 150 in particular message flows 160, including a time stamp for a first packet 150 and a time stamp for a last packet 150 in the message flow 160, a cumulative total number of bytes in the message flow 160, a cumulative total number of packets 150 in the message flow 160, or other information relevant to diagnosing actual or potential network problems.

Interested parties may determine patterns of usage of the network by date and time or by location. For example, the report may comprise information about which users or which services on the network are making relatively heavy use of resources. In a preferred embodiment, usage of the network 100 is displayed in a graphical form which shows use of the network 100 in a false-color map, so that network administrators and other interested parties may rapidly determine which services, which users, and which communication links are relatively loaded or relatively unloaded with demand.

Interested parties may determine which services are accessed by particular users, or which users access particular services. For example, the report may comprise information about which services are accessed by particular users at a particular device on the network 100, or which users access a particular service at a particular device on the network 100. This information may be used to market or otherwise enhance these services. In a preferred embodiment, users who access a particular world wide web page using the HTTP protocol are recorded, and information is sent to those users about changes to that web page and about further services available from the producers of that web page. Providers of the particular web page may also collect information about access to their web page in response to date and time of access, and location of accessing user.

Information about patterns of usage of the network, or about which services are accessed by particular users, or which users access particular services, may be used to implement accounting or billing for resources, or to set limits for resource usage, such as by particular users, by particular service providers, or by particular protocol types (and therefore by particular types of services).

Interested parties may determine usage which falls within (or without) selected parameters. These selected parameters may involve access during particular dates or times, such as for example access to particular services during or outside normal working hours. For example, it may be desirable to record those accesses to a company database which occur outside normal working hours.

These selected parameters may involve access to prohibited services, excessive access to particular services, or excessive use of network resources, such as for example access to particular servers using the HTTP protocol or the FTP protocol which fall within (or without) a particular administrative policy. For example, it may be desirable to record accesses to repositories of games or other recreational material, particularly those accesses which occur within normal working hours.

These selected parameters may involve or lack of proper access, such as for example access control list failures or unauthorized attempts to access secure services. For example, it may be desirable to record unauthorized attempts to access secure services, particularly those attempts which form a pattern which might indicate a concerted attempt to gain unauthorized access.

In alternative embodiments, the routing device 140 could save the actual packets 150 for the message flow 160, or some part thereof, for later examination. For example, a TELNET session (a message flow 160 comprising use of the TELNET protocol by a user and a host) could be recorded in its entirety, or some portion thereof, for later examination, e.g., to diagnose problems noted with the network or with the particular host.

In further alternative embodiments, the routing device 140 could save the actual packets 150 for selected message flows 160 which meet certain selected parameters, such as repeated un-authorized attempts to gain access.

In embodiments where actual packets 150 of the message flow 160 are saved, it would be desirable to perform a name translation (such as a reverse DNS lookup), because the IP addresses for the source device 120 and the destination device 130 are transitory. Thus, it would be preferable to determine the symbolic names for the source device 120 and the destination device 130 from the IP addresses, so that the recorded data would have greater meaning at a later time.

Alternative Embodiments

Although preferred embodiments are disclosed herein, many variations are possible which remain within the concept, scope, and spirit of the invention, and these variations would become clear to those skilled in the art after perusal of this application.

We claim:

1. A method for routing messages in a network, said method comprising:
   (a) identifying a first packet of a first stream having at least one first routing treatment in common by searching a flow cache for a match with the first packet, and identifying the first packet when no match is found by the searching;
   (b) recording said first routing treatment when no match is found by the search;
   (c) identifying a second packet of said first stream of packets by searching the flow cache for a match with the second packet, and identifying the second packet when a match is found by the searching;
   (d) routing said second packet responsive to said first routing treatment;
   wherein said first stream of packets is associated with a selected source device and a selected destination device.

2. A method as in claim 1, wherein said stream of packets is associated with a first selected port number at said source device and a second selected port number at said destination device.

3. A method as in claim 1, wherein said first stream of packets comprises an ordered sequence, and said first packet has a selected position in said ordered sequence.

4. A method as in claim 1, wherein said first stream of packets is transmitted between a selected pair of transport access points.

5. A method as in claim 1, wherein said step of recording comprises building an entry in a flow cache.

6. A method as in claim 1, further comprising (e) identifying a packet of a second stream of packets, said second stream of packets having at least one second routing treatment in common, said second routing treatment differing from said first routing treatment.

7. A method as in claim 1, wherein said routing treatment comprises access control information for said first packet.

8. A method as in claim 1, wherein said routing treatment comprises a destination output port for routing said first packet.

9. A method as in claim 1, further comprising:
   (e) recording information about said first stream of packets; and
   (f) transmitting said information to at least one selected device on staid network.

10. A method as in claim 9, wherein said information includes:
- a transmission time for an initial packet in said first stream of packets;
- a transmission time for a most recent one packet in said first stream of packets;
- a cumulative count of bytes in said first stream of packets; or
- a cumulative count of said packets in said first stream of packets.

11. A method as in claim 9, further comprising:
- (e) receiving said information at said selected device on said network;
- (f) recording said information in a database at said selected device; and
- (g) making said information available to a second device on said network.

12. A method as in claim 9, wherein said information includes:
- a transmission time for an initial packet in said first stream of packets.

13. A method as in claim 9, wherein said information includes:
- a transmission time for a most recent packet in said first stream of packets.

14. A method as in claim 9, wherein said information includes:
- a cumulative count of bytes in said first stream of packets.

15. A method as in claim 9, wherein said information includes:
- a cumulative count of said packets in said first stream of packets.

16. A system for routing packets in a network, said system comprising:
- (a) means for receiving a plurality of packets, said plurality of packets comprising a plurality of message flows, each message flow comprising a stream of packets associated with a selected source device and a selected destination device, each said packet being associated with one selected message flow, and each said message flow having at least one routing treatment in common;
- (b) means for associating packets with a first one of said message flows;
- (c) means for searching a flow cache for a match with said first one message flow;
- (d) means for inputting an entry into the flow cache associated with said first one message flow when no match is found by the searching; and
- (e) means for routing packets responsive to entries in said flow cache.

17. A system as in claim 16, wherein said entry comprises access control information.

18. A system as in claim 17, wherein said entry comprises a destination output port for routing packets.

19. A system as in claim 16, further comprising (e) means for transmitting information responsive at least one said entry to at least one selected device on said network.

20. A system as in claim 19, wherein said information includes:
- a transmission time for a first packet in each message flow;
- a transmission time for a most recent packet in each message flow;
- a cumulative count of bytes in each message flow; or
- a cumulative count of a number of packets in each message flow.

21. A system as in claim 19, wherein said information includes:
- a transmission time for a first packet in each message flow.

22. A system as in claim 19, wherein said information includes:
- a transmission time for a most recent packet in each message flow.

23. A system as in claim 19, wherein said information includes:
- a cumulative count of bytes in each message flow.

24. A system as in claim 19, wherein said information includes:
- a cumulative count of a number of packets in each message flow.

25. A system for routing packets in a network, said system comprising:
- (a) a routing device to receive a plurality of packets, said plurality of packets comprising a plurality of message flows, each message flow comprising a stream of packets associated with a selected source device and a selected destination device, each said packet being associated with one selected message flow, and each said message flow having at least one routing treatment in common, wherein said routing device includes:
  - (a1) a routing processor to associate packets with a first one of said message flows;
  - (a2) a flow cache having an entry associated with said first one message flow, wherein said routing processor searches said flow cache for a match with said first one message flow and inputs the entry associated with said first one message flow when no match is found by the searching; and
  - (a3) the routing processor routing packets responsive to entries in said flow cache.

26. A system as in claim 25, wherein said entry comprises access control information.

27. A system as in claim 26, wherein said entry comprises a destination output port for routing packets.

28. A system as in claim 27, wherein said routing processor further transmits information responsive at least one said entry to at least one selected device on said network.

29. A system as in claim 28, wherein said information includes:
- a transmission time for a first packet in each message flow;
- a transmission time for a most recent packet in each message flow;
- a cumulative count of bytes in each message flow; or
- a cumulative count of a number of packets in each message flow.

30. A system as in claim 29, wherein said information includes:
- a transmission line for a first packet in each message flow.

31. A system as in claim 29, wherein said information includes:
- a transmission time for a most recent packet in each message flow.

32. A system as in claim 29, wherein said information includes:
- a cumulative count of bytes in each message flow.

33. A system as in claim 29, wherein said information includes:
- a cumulative count of a number of packets in each message flow.

* * * * *

UNITED STATES PATENT AND TRADEMARK OFFICE
CERTIFICATE OF CORRECTION

PATENT NO.    : 6,590,894 B1
DATED         : July 8, 2003
INVENTOR(S)   : Darren R. Kerr et al.

It is certified that error appears in the above-identified patent and that said Letters Patent is hereby corrected as shown below:

<u>Column 10,</u>
Line 67, after "on" delete "staid" and insert -- said --.

Signed and Sealed this

Twenty-fourth Day of February, 2004

JON W. DUDAS
*Acting Director of the United States Patent and Trademark Office*